(12) United States Patent
Mannion et al.

(10) Patent No.: US 7,505,578 B2
(45) Date of Patent: Mar. 17, 2009

(54) LOAD BALANCING IN A NETWORK OF CONTACT CENTRES

(75) Inventors: Liam Mannion, Galway (IE); Seamus Hayes, Galway (IE); Donald McNelis, Falkirk (GB); Paul Kelly, Co. Galway (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 211 days.

(21) Appl. No.: 10/650,227

(22) Filed: Aug. 28, 2003

(65) Prior Publication Data

US 2005/0047585 A1 Mar. 3, 2005

(51) Int. Cl.
*H04M 3/00* (2006.01)
*H04M 5/00* (2006.01)

(52) U.S. Cl. .............................. 379/265.12; 379/265.14; 379/265.11; 379/266.04; 709/226; 370/270; 455/416; 455/418; 455/426.1; 455/426.2; 455/428

(58) Field of Classification Search ............ 379/265.12, 379/265.14, 266.04, 265.11; 370/270; 709/226; 455/416, 418, 426.1, 426.2, 428

See application file for complete search history.

(56) References Cited

U.S. PATENT DOCUMENTS

| | | | | |
|---|---|---|---|---|
| 5,291,552 A | * | 3/1994 | Kerrigan et al. | 379/266.04 |
| 5,299,259 A | * | 3/1994 | Otto | 379/266.04 |
| 5,450,482 A | * | 9/1995 | Chen et al. | 379/230 |
| 5,530,744 A | * | 6/1996 | Charalambous et al. | 379/266.08 |
| 5,546,452 A | | 8/1996 | Andrews et al. | |
| 5,555,299 A | * | 9/1996 | Maloney et al. | 379/212.01 |
| 5,754,639 A | * | 5/1998 | Flockhart et al. | 379/266.05 |
| 5,757,904 A | * | 5/1998 | Anderson | 379/265.06 |
| 5,844,982 A | * | 12/1998 | Knitl | 379/265.11 |
| 5,848,143 A | | 12/1998 | Andrews et al. | |
| 5,878,130 A | | 3/1999 | Andrews et al. | |
| 5,915,012 A | * | 6/1999 | Miloslavsky | 379/265.02 |
| 5,987,117 A | * | 11/1999 | McNeil et al. | 379/265.1 |
| 6,175,564 B1 | * | 1/2001 | Miloslavsky et al. | 370/352 |
| 6,377,975 B1 | * | 4/2002 | Florman | 709/203 |
| 6,445,788 B1 | * | 9/2002 | Torba | 379/266.08 |
| 6,522,743 B1 | * | 2/2003 | Hurd | 379/266.04 |
| 6,526,397 B2 | * | 2/2003 | Chee et al. | 707/1 |
| 6,687,241 B1 | * | 2/2004 | Goss | 370/352 |
| 6,813,636 B1 | * | 11/2004 | Bean et al. | 709/226 |

\* cited by examiner

*Primary Examiner*—Stephen M D'Agosta

(57) ABSTRACT

Load balancing between agents in a network skillset has become a particular problem. Not only is there a need to ensure efficient use of agent resources in the network skillset but increasingly labor law and union requirements mean that work must be shared between agents in an equitable manner. A source contact node in a network of contact centers requests nodal longest idle agent information from the other contact centers in the network. Using this information a network longest idle agent is identified and the incoming contact routed to that agent. A reservation system is used in combination with the longest idle agent information in order to prevent dropped contacts and to ensure equal sharing of work between agents in a network skillset. Contact center servers are linked over a separate network, isolated from a network linking the contact center switches.

13 Claims, 3 Drawing Sheets

LOAD BALANCING IN A NETWORK OF CONTACT CENTRES

FIELD OF THE INVENTION

The present invention relates to a method and apparatus for routing contacts between a plurality of contact centers in a communications network.

BACKGROUND TO THE INVENTION

Call centers are known in which incoming calls are routed to one of a plurality of agents. For example, the call center might provide help desk facilities for a particular group of products and customers who are able to call in and be allocated to an agent who has the necessary skills to deal with his or her query. Each agent has one or more skills, for example, a particular agent has knowledge about sales for product X and about technical support for product Y. An incoming call is received and information from that call used by the call center, together with information about the agents, in order to route the incoming call to an agent with the appropriate skill. For example, an interactive voice response system (IVR system) may be used to find out what type of agent skill is required. Associated with each skill is a queue into which incoming calls are placed until an agent with that skill becomes available. The terms "call center" and "contact center" as used herein are not intended to be restricted to situations in which telephone calls are made to the center. Other types of call or contact are also envisaged, such as email, fax, short messaging system (SMS), chat, web access and any other suitable method of contact including conventional telephone calls and voice over internet protocol telephone calls. Similarly, the terms "call" and "contact" as used herein are not intended to be restricted to conventional telephone calls but include contacts made by email, fax, voice over Internet Protocol (IP) and any other suitable medium.

It is known to use a network of contact centers and to route contacts from one of those contact centers to another contact center in the network. For example, if one contact center is particularly busy, contacts can be routed to another less busy contact center. In this type of network of contact centers so called "network skillsets" also known as "workgroups" are often used. Agents with particular knowledge and ability can be members of a network skillset despite being associated with different contact centers in the network. For example, suppose there is a network skillset for agents who speak French. Agents can be allocated to that network skillset despite being located at different call centers, provided they speak French. Incoming contacts that require service by a French speaking agent can then be allocated to any of the agents in the French network skillset. A particular agent can be a member of more than one different network skillset.

As the volumes of traffic increase to call centers and the number of different agent skills increases the complexity of routing incoming contacts to the appropriate queues increases. In addition, there is a need to balance workload between not only the different contact centers in the network but also between agents in network skillsets.

Recently such load balancing between agents in a network skillset has become a particular problem. Not only is there a need to ensure efficient use of agent resources in the network skillset but increasingly labor law and union requirements mean that work must be shared between agents in an equitable manner.

As described in the following three US patent documents U.S. Pat. Nos. 5,546,452; 5,878,130; 5,848,143 a central controller is used to collect information from all contact centers in a network. That processor then receives all incoming contacts and routes those to the contact centers on the basis of the collected information and an optimisation algorithm or strategy. For example, these three patent documents describe seeking to route a contact to the highest skilled and longest available (i.e. longest inactive) agent in a workgroup. However, a problem with this approach is that there is no guarantee that the contact will be successfully routed to the longest inactive agent in the workgroup. If the chosen agent has in the meantime become active with another contact, the pending contact risks being dropped. This leads to customer dissatisfaction and potential loss of business. Alternatively, if the chosen agent is no longer inactive, the pending contact is routed to a different agent with the result that the required load balancing is not achieved. Another problem with the approach described in these three patent documents is that a central controller must be provided to which status information from all contact centers is sent. In addition, all incoming contacts need to be routed via the central controller. This is a complex approach which requires additional network equipment, increases traffic requirements in the network and is not robust because failures at the central controller affect the whole process.

OBJECT TO THE INVENTION

The invention seeks to provide a method and apparatus for routing contacts between a plurality of contact centers in a communications network which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

As mentioned above, load balancing between agents in a network skillset has become a particular problem. Not only is there a need to ensure efficient use of agent resources in the network skillset but increasingly labor law and union requirements mean that work must be shared between agents in an equitable manner. The present invention addresses these problems by using a source contact node in a network of contact centers to request nodal longest idle agent information from the other contact centers in the network. Using this information a network longest idle agent is identified and the incoming contact routed to that agent. A reservation system is used in combination with the longest idle agent information in order to prevent dropped contacts and to ensure equal sharing of work between agents in a network skillset. Contact center servers are linked over a separate network, isolated from a network linking the contact center switches. This enables real-time communications between the contact center servers to quickly and effectively share the nodal longest idle agent information and/or other contact center management information, statistics, parameters or "intrinsics".

According to an aspect of the present invention there is provided a method of routing a contact in a network comprising a plurality of contact centers, said method comprising the steps of:

receiving a contact at one of the contact centers, said contact center being a source contact center;

sending a reservation request from the source contact center to each of the contact centers, said reservation request being for an agent with a specified relative intrinsic value;

for one or more of the reservation requests, receiving at the source contact center, a value of the specified intrinsic and an associated agent identifier;

routing the received contact to one of the agents on the basis of the received intrinsic.

This provides the advantage that load balancing can be achieved in a particular manner on the basis of intrinsics such as longest idle agent, average answer delay, calls queued count, calls answered count, number of idle agents, expected wait time and logged-in agent count. By using the reservation requests in conjunction with the intrinsic it is possible to ensure that the load balancing method based on the particular intrinsic is implemented correctly.

According to another aspect of the invention there is provided a method of routing a contact in a network comprising a plurality of contact centers, said method comprising the steps of:

receiving a contact at one of the contact centers, said contact center being a source contact center;

sending a reservation request from the source contact center to each of the contact centers, said reservation request being for a nodal longest idle agent;

for one or more of the reservation requests, receiving at the source contact center, a nodal longest idle time and associated agent identifier;

routing the received contact to the agent with the longest of all the received nodal longest idle times.

This provides the advantage that true "longest idle agent" routing is achieved and work is allocated equally between agents to meet union or other requirements. By using the reservation requests in conjunction with the longest idle agent information it is possible to ensure true "longest idle agent" routing rather than a "next best" or "pragmatic working" alternative.

Preferably the method further comprises the step of cancelling unused reservations. This frees up reserved agents for other incoming contacts.

Preferably the contact is received at any one of the contact centers. This is advantageous because it is not necessary to configure one of the contact centers (or one particular node) to receive all the incoming contacts. This reduces the amount of processing needed at any one of the contact centers and provides a robust system because for example, contacts can still be successfully routed despite failure at one of the contact centers.

Preferably said contact is associated with a specified network skillset and wherein said reservations requests are also for agents of that specified skillset. This provides the advantage that equal allocation of work can be achieved for agents in a network skillset, despite the fact that those agents are spread throughout the network.

According to another aspect of the present invention there is provided a contact center suitable for use in a network of contact centers, said contact center comprising:

an input arranged to receive a contact;

an output arranged to send a reservation request to one or more contact centers in the network of contact centers, said reservation request being for an agent with a specified relative intrinsic value;

a second input arranged to receive, for one or more of the reservation requests, a value of the specified intrinsic and an associated agent identifier;

a processor arranged to route the contact to one of the agents on the basis of the received intrinsic.

According to another aspect of the invention there is provided a contact center suitable for use in a network of contact centers, said contact center comprising:

an input arranged to receive a contact;

an output arranged to send a reservation request to one or more contact centers in the network of contact centers, said reservation request being for a nodal longest idle agent;

a second input arranged to receive, for one or more of the reservation requests, a nodal longest idle time and associated agent identifier;

a processor arranged to route the contact to the agent with the longest of all the received nodal longest idle times.

According to another aspect of the invention there is provided a communications network comprising a plurality of contact centers as described above. Preferably, each of said contact centers comprises a contact center server and a switch. The contact center servers are advantageously linked to one another by a first part of said communications network and said switches are linked to one another by a second part of said communications network, said first and second parts being substantially isolated from one another. This provides the advantage that signalling traffic between the contact center servers is insulated from all other types of traffic. In this way information about intrinsic values such as longest idle agent information is quickly and simply passed between contact centre servers.

It is also preferred that each contact center server is connected to its associated switch using a dedicated embedded local area network connection. In this way signalling traffic between a switch and its associated server is insulated from all other types of signalling such as inter-contact center server signalling or signalling between a contact center server and an administrator client server.

The invention also provides for a system for the purposes of digital signal processing which comprises one or more instances of apparatus embodying the present invention, together with other additional apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

The term "nodal longest idle agent (LIA)" is used to refer to an agent who is not actively dealing with a contact and, of all the agents associated with the same contact center server, has been in this idle state for the longest time.

The term "network longest idle agent" is used to refer to an agent who is not actively dealing with a contact and, of all the agents in a network of contact centers, has been in this state for the longest time.

The term "longest idle time" means the time for which the longest idle agent has been idle. For example, longest network idle time is the time for which the network longest idle agent has been idle.

The term "intrinsic" means an item of information about a contact center such as a statistic or parameter. Examples include nodal longest idle agent, average answer delay, calls queued count, calls answered count, number of idle agents, expected wait time and logged-in agent count.

Average answer delay is an indication of how quickly a particular agent answers a contact that is routed to him or her.

Calls queued count is the number of calls or contacts queued for a particular agent.

Calls answered count is the number of calls or contacts answered within a specified time period, either by a particular agent or by a contact center as a whole.

Number of idle agents is the number of agents at a specified contact center who are inactive at a particular time.

Expected wait time is an indication of how long it will take for a contact to be routed to an available agent at a particular time. If agents are available to serve a call when it arrives, this parameter is zero.

Logged-in agent count is the number of agents, either for a particular network skillset or for a particular contact center, that are logged-in at a particular time.

Figure 1:
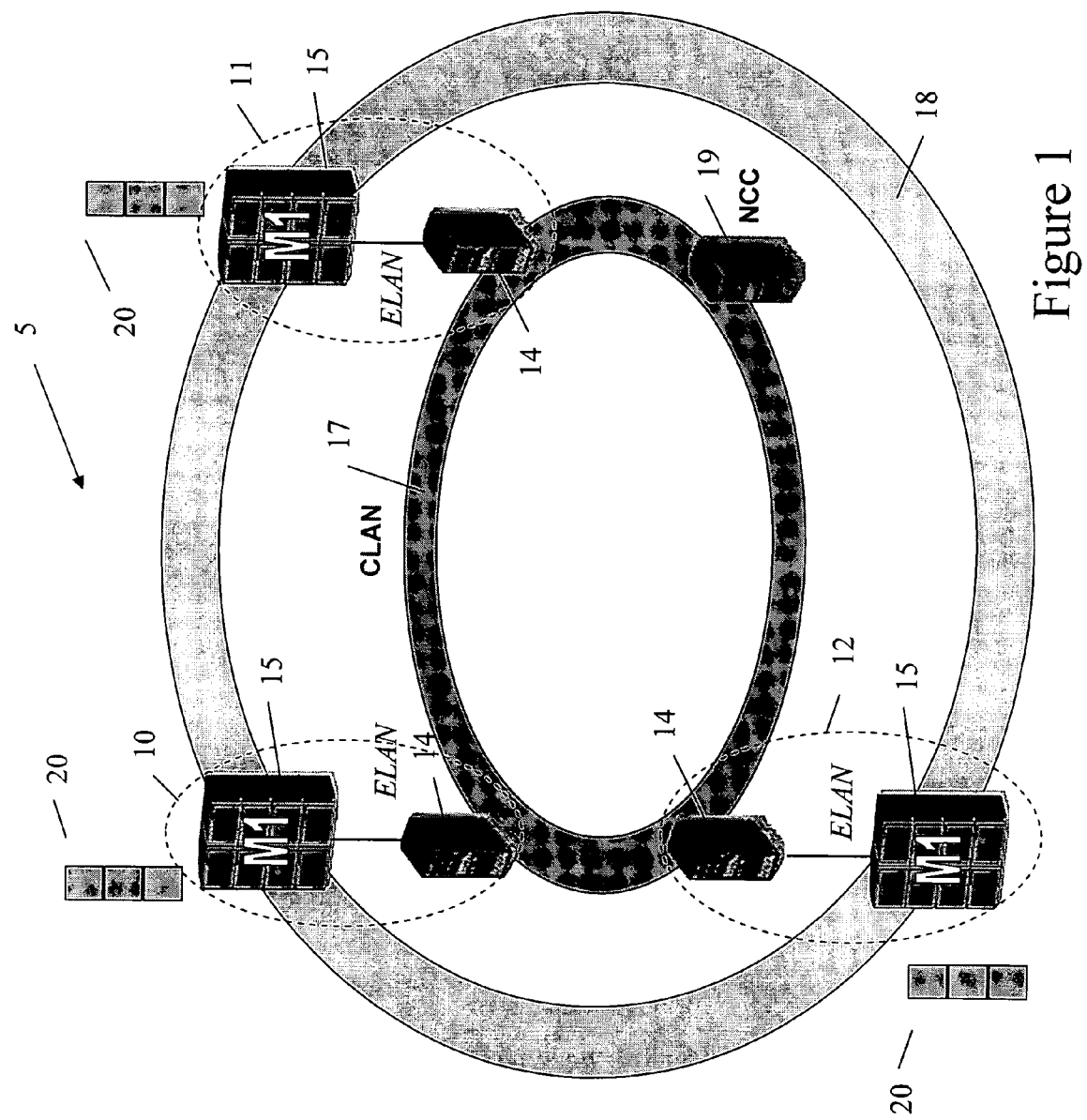
FIG. 1 is a schematic diagram of a network of contact centers suitable for use with the present invention.

FIG. 1 is a schematic diagram of a plurality of contact centers 10, 11, 12 in a communications network 5. Each contact center comprises a call center server 14 and a switch 15 (referenced as "M1" in the drawings). Any suitable type of call center server can be used. The switches 15 are arranged to receive incoming contacts and route these to the associated call center server 14. Each switch 15 is connected to a plurality of agent stations as known in the art and is instructed to route incoming contacts either to those agent stations or to other contact center servers 14 in the network by the contact center server. Any suitable type of switch can be used. For example, if the contact center is a multi-media contact center means is provided for contacts of different media type to reach the contact center server as known in the art.

In the example illustrated in FIG. 1 each contact center server is connected to its associated switch using a dedicated embedded local area network (ELAN) connection. This provides the advantage that signalling traffic between the switch and its associated server is insulated from all other types of signalling (e.g. inter-contact center server signalling over a customer LAN (CLAN) or signalling between a contact center server and admin client servers); thus the engineering limits for ELAN traffic do not have to take these other forms of signalling into account and are defined solely on the basis of incoming call traffic. Communication between the contact center server and the switch takes place using any suitable protocol as known in the art.

In a preferred embodiment, the contact center servers are linked to one another using a CLAN 17 (customer LAN) which is isolated from the connections between each of the contact center servers and its associated switch. This substantial isolation or insulation is implemented for capacity reasons equivalent to those explained above with reference to the ELAN connections. In addition, the switches 15 are linked to one another using trunks 18 supporting any suitable communications protocol. The network between the switches is provided to connect voice channels between terminals which reside on different switches. The CLAN network between the contact center servers is used to exchange signalling information on calls (e.g. for the contact center servers to agree which node will receive a call). Once the source node decides where a call will be routed, a path such as a speech path for example is connected between the source and target switches.

A Network Control Center (NCC) server 19 is also provided. This is connected to the CLAN such that it can communicate with each of the contact center servers 14. However this NCC is not connected to the switches 15. The NCC 19 creates routing tables 20 and propagates these to each of the contact center servers 14 as known in the art.

Figure 2:
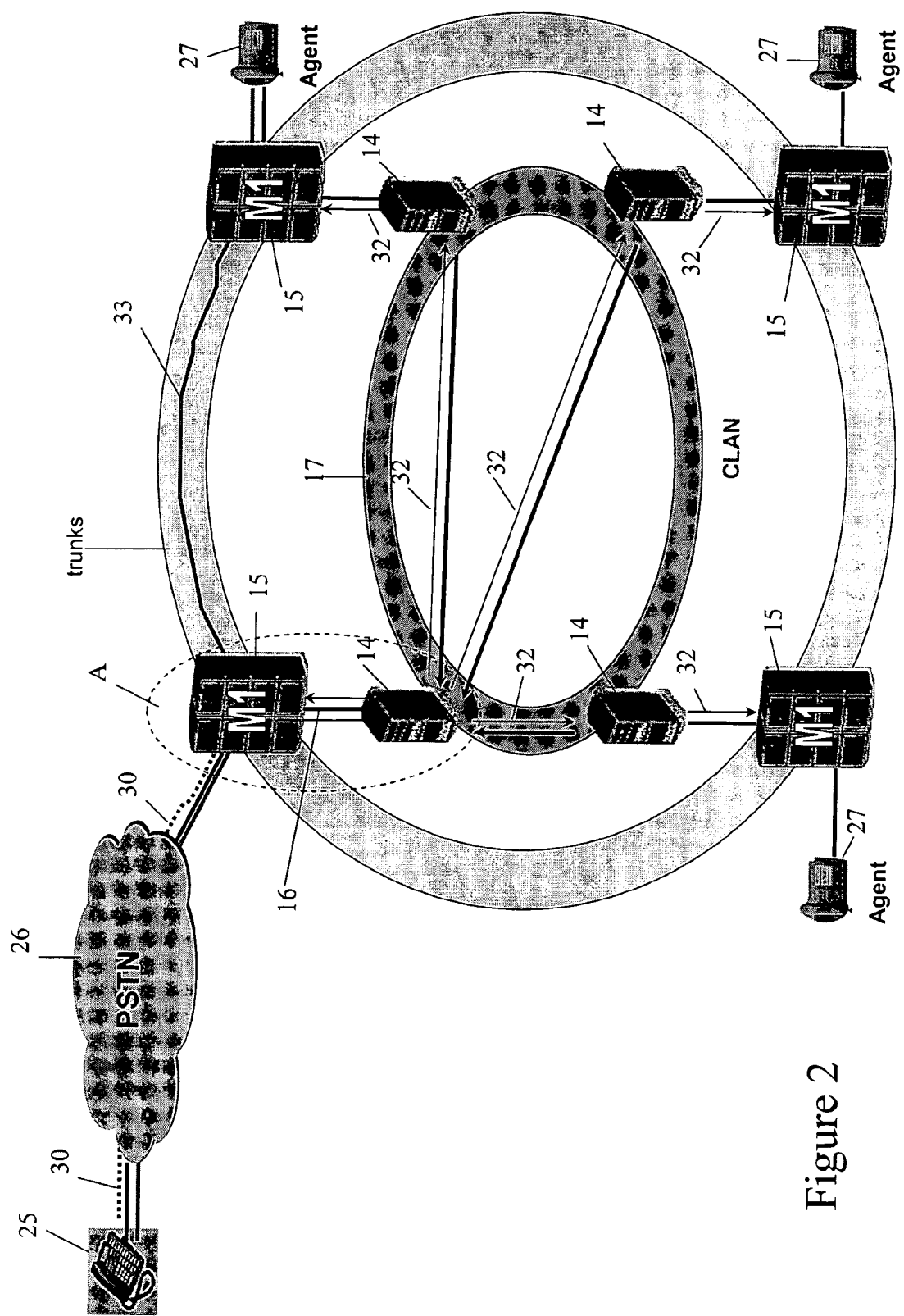
FIG. 2 shows the network of FIG. 1 and includes arrows indicating a flow of messages through the network.

As mentioned above, each of the switches 15 is arranged to enable incoming contacts to reach the associated contact center server 14. This is illustrated in FIG. 2 which shows a user terminal 25 connected to a public switched telephone network (PSTN) 26 which is in turn connected to one of the switches 15. FIG. 2 also shows agents 27 connected to the switches 15.

A method of routing a contact in the communications network of FIG. 2 is now described. A customer using the terminal 25 places a call to source contact center A over the PSTN 26. This is illustrated by dotted line 30 in FIG. 2. The contact is held at switch 15 of the source contact center whilst the contact center server 14 at that source queues the incoming contact to all the other contact center servers 14 in the network as well as to itself. This is illustrated by arrows 32 in FIG. 2. This process requests a reservation for an agent associated with a particular intrinsic value. Any suitable intrinsic value can be used such as the nodal longest idle agent, average answer delay, calls queued count, next-but-one longest idle agent, or similar at each of the contact centers. The requests are sent over the CLAN 17 to each contact center server 14 and from there to each switch 15 using a reserve message over the dedicated ELAN 16. Any suitable reserve message can be used.

The source contact center A waits for a response from each of the contact center servers 14 over the CLAN 17. These responses comprise an identifier for each agent associated with the particular intrinsic value (e.g. nodal longest idle agent) as well as the intrinsic value itself (e.g. nodal longest idle time). Using this information the source contact center A determines a network-wide value of the intrinsic such as the network longest idle agent time. It then instructs its associated switch 15 to route the incoming contact to the associated agent. For example, the network longest idle agent. If this agent is at a different contact center then the contact is routed to the relevant switch 15 over the trunks. For example, line 33 in FIG. 2 illustrates a contact being transferred from contact center A to an agent 27 at another contact center.

Figure 3:
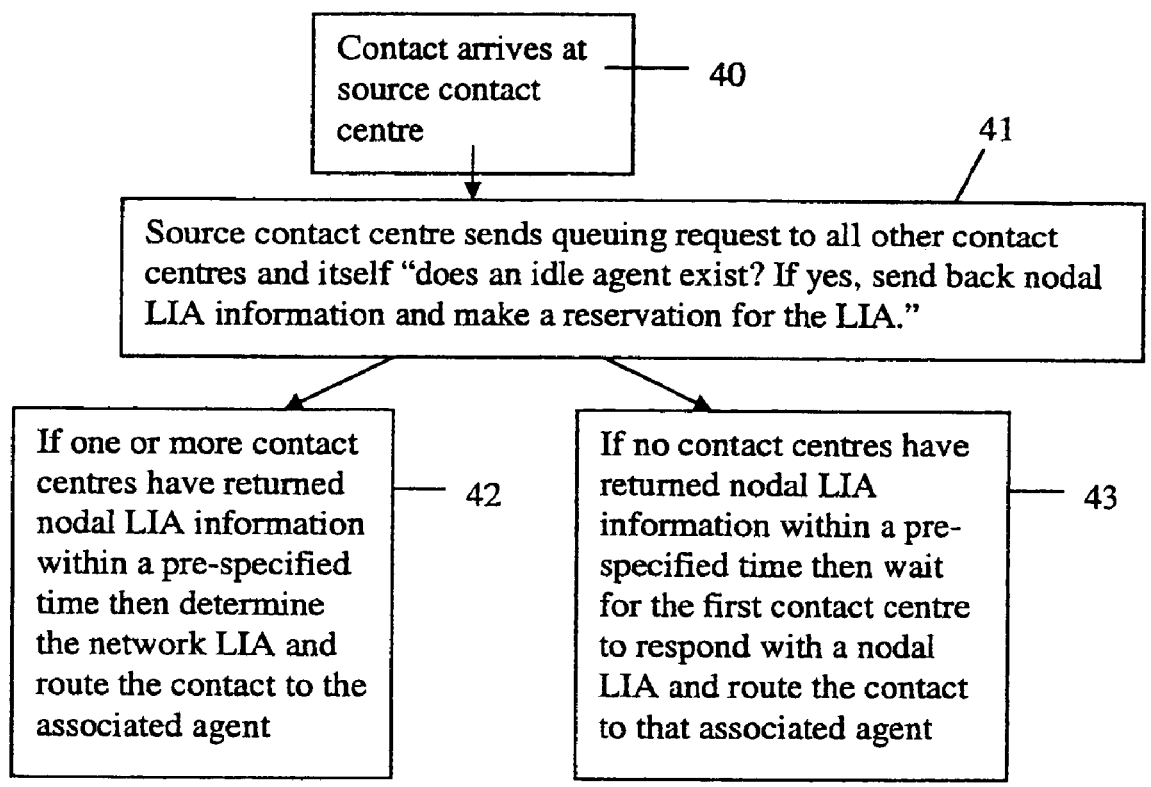
FIG. 3 is a flow diagram of a method of routing a contact in a network of contact centers such as that of FIG. 1.

This method is now described in more detail with reference to FIG. 3. A contact arrives at a source center centre (see box 40). The source contact center then sends a queuing request to all other contact centers (see box 41), including itself, to request and reserve an agent associated with a particular intrinsic value. Any intrinsic may be used as mentioned above, for example, the nodal longest idle agent. The queuing request requires the contact centers to determine the nodal longest idle agent, to send back an identifier for that agent together with the nodal idle agent time, as well as making a reservation for that agent. The source contact center waits for a pre-specified time. If, during that time, one or more of the other contact centers have returned nodal longest idle agent information (or other intrinsic information as mentioned above), the source contact center compares the nodal longest idle times to find the greatest. This is the network longest idle agent time. The source contact center is then able to instruct its associated switch to route the contact to the network longest idle agent (see box 42).

If no contact centers return nodal longest idle agent information during the pre-specified time, this means that no suitable agents are currently available. In that case, the source contact center server A waits for the first response it receives. This first response will be for the network longest idle agent because no other suitable agents are available. In that case the contact is routed to the agent identified in the first response (see box 43).

Preferably the method is carried out for particular network skillsets. In that case, the incoming contact requires a specified network skillset, as determined by an interactive voice response (IVR) system or other suitable means. The source contact center sends reservation requests to only those contact centers which have members of the required network skillset and the reservation requests and longest idle agent information are all specific to the particular network skillset.

Advantageously, the source contact center server places reservations at the other contact center servers. This ensures that when the contact is eventually routed to the network longest idle agent, that agent is available and the contact is not dropped. This is achieved without the need for a central controller as in the prior art and a simple, robust system results. In addition, by using the reservation method in combination with the intrinsic information in a distributed manner it is possible to guarantee a specified distribution of contacts between agents in a network skillset. For example, the amount of work can be shared equally between agents in a network skillset, by ensuring new work is always allocated to the network longest idle agent.

Once the incoming contact has been routed to the selected agent the unused reservations at any of the other contact centers are cancelled by the source contact center server.

Preferably, each contact center server is arranged to continually monitor for intrinsic values in each skillset. It is then able to provide this information immediately on request from the source contact center. In this manner the process of routing the contact to a chosen agent is able to operate in real time. Communication between the contact center servers via the CLAN is separate from communication between the switches 15. This facilitates inter contact center server communication in order that the agent selection is achieved quickly and effectively in real time.

In the embodiments described above the intrinsic "longest idle agent" is mentioned. However, it is also possible to use different intrinsics such as average answer delay or calls queued count. Also, it is possible to use an intrinsic such as the "next-but-one longest idle agent" in order to achieve a workable result.

Any range or device value given herein may be extended or altered without losing the effect sought, as will be apparent to the skilled person for an understanding of the teachings herein.

The invention claimed is:

1. A method of routing a contact in a network comprising a plurality of contact centers, said method comprising the steps of:
   a) receiving a contact at any one of the contact centers, said any one of the contact centers being designated a source contact center with respect to the received contact;
   b) sending a reservation request from the source contact center to each of the contact centers including itself at the same time, said reservation request being for an agent with a specified relative intrinsic value;
   c) for said reservation request, receiving at the source contact center from each of one or more of the contact centers, a value of the specified intrinsic and an associated agent identifier;
   d) at said designated source contact center, determining from said value of the specified intrinsic and said associated agent identifier received from said each of one or more of the contact centers a suitable agent in any of said one or more of the contact centers for processing the received contact;
   e) routing the received contact from the designated contact center to said suitable agent.

2. A method as claimed in claim 1 wherein said specified intrinsic is selected from nodal longest idle agent, average answer delay and calls queued count.

3. A method of routing a contact in a network comprising a plurality of contact centers, said method comprising the steps of:
   (i) receiving a contact at any one of the contact centers, said any one of the contact centers being designated a source contact center with respect to the received contact;
   (ii) sending a reservation request from the source contact center to each of the contact centers including itself at the same time, said reservation request being for a nodal longest idle agent;
   (iii) for said reservation request, receiving at the source contact center from each of one or more of the contact centers, a nodal longest idle time and associated agent identifier;
   (iv) at said designated source contact center, determining from said nodal longest idle time and said associated agent identifier received from said each of one or more of the contact centers an agent in any of said one or more of the contact centers with the longest of all the received nodal longest idle times;
   (v) routing the received contact from the designated contact center to the agent with the longest of all the received nodal longest idle times.

4. A method as claimed in claim 3 which further comprises the step of (vi) cancelling unused reservations.

5. A method as claimed in claim 3 wherein said step (iii) of receiving at the source contact center is carried out in a pre-specified time interval.

6. A method as claimed in claim 1 or 3 wherein said contact is associated with a specified network skillset and wherein said reservation request is also for agents of that specified skillset.

7. A method as claimed in claim 3 which further comprises determining at the source contact center a network longest idle agent.

8. A contact center suitable for use in a network of contact centers, said contact center comprising:
   (i) an input arranged to receive a contact;
   (ii) an output arranged to send a reservation request to each of the contact centers in the network of contact centres including itself at the same time, said reservation request being for an agent with a specified relative intrinsic value;
   (iii) a second input arranged to receive, for said reservation request, a value of the specified intrinsic and an associated agent identifier from each of one or more of the contact centers;
   (iv) a processor arranged to determine from said value of the specified intrinsic and said associated agent identifier received from said each of one or more of the contact centers a suitable agent in any of said one or more of the contact centers for processing the received contact and to route the contact from the designated contact center to said suitable agent;

wherein said contact center is capable of receiving a reservation request in respect of a different contact from any contact center in said network of contact centers.

9. A communications network comprising a plurality of contact centers each as claimed in claim 8.

10. A communications network as claimed in claim 9 wherein each of said contact centers comprises a contact center server and a switch.

11. A communications network as claimed in claim 10 said contact center servers being linked to one another by a first part of said communications network and said switches being linked to one another by a second part of said communications network, said first and second parts being substantially isolated from one another.

12. A communications network as claimed in claim 10 wherein each contact center server is connected to its associated switch using a dedicated embedded local area network connection.

13. A contact center suitable for use in a network of contact centers, said contact center comprising:

(i) an input arranged to receive a contact;

(ii) an output arranged to send a reservation request to each of the contact centers in the network of contact centres including itself at the same time, said reservation request being for a nodal longest idle agent;

(iii) a second input arranged to receive, for said reservation request, a nodal longest idle time and associated agent identifier from each of one or more of the contact centers;

(v) a processor arranged to determine from said nodal longest idle time and said associated agent identifier received from said each of one or more of the contact centers an agent in any of said one or more of the contact centers with the longest of all the received nodal longest idle times and to route the contact from the designated contact center to the agent with the longest of all the received nodal longest idle times;

wherein said contact center is capable of receiving a reservation request in respect of a different contact from any contact center in said network of contact centers.

* * * * *